(12) United States Patent
Gallant et al.

(10) Patent No.: US 7,076,500 B2
(45) Date of Patent: Jul. 11, 2006

(54) SELECTIVE FILE CACHING METHOD

(76) Inventors: David Gallant, 4726 E. 107th Ave., Thornton, CO (US) 80233; Rex Vedder, 2830 Heidelberg Dr., Boulder, CO (US) 80305

(*) Notice: Subject to any disclaimer, the term of this patent is extended or adjusted under 35 U.S.C. 154(b) by 521 days.

(21) Appl. No.: 10/610,142

(22) Filed: Jun. 30, 2003

(65) Prior Publication Data

US 2004/0267702 A1 Dec. 30, 2004

(51) Int. Cl.
*G06F 7/00* (2006.01)
(52) U.S. Cl. .................. 707/102; 709/246; 711/202
(58) Field of Classification Search ............. 707/102; 709/246; 711/202
See application file for complete search history.

(56) References Cited

U.S. PATENT DOCUMENTS

| | | | | |
|---|---|---|---|---|
| 6,029,175 | A * | 2/2000 | Chow et al. ............. 707/104.1 |
| 6,192,398 | B1 * | 2/2001 | Hunt ........................ 709/213 |
| 6,457,103 | B1 * | 9/2002 | Challenger et al. ......... 711/133 |
| 6,557,054 | B1 * | 4/2003 | Reisman .................... 710/33 |
| 6,557,076 | B1 * | 4/2003 | Copeland et al. ........... 711/118 |
| 6,918,113 | B1 * | 7/2005 | Patel et al. ................. 717/178 |
| 6,976,090 | B1 * | 12/2005 | Ben-Shaul et al. .......... 709/246 |
| 6,988,135 | B1 * | 1/2006 | Martin et al. ............... 709/224 |
| 2002/0049834 | A1 * | 4/2002 | Molnar ....................... 709/219 |
| 2003/0009563 | A1 * | 1/2003 | Douglis et al. ............. 709/227 |
| 2003/0078964 | A1 * | 4/2003 | Parrella et al. ............. 709/203 |
| 2004/0181598 | A1 * | 9/2004 | Paya et al. .................. 709/227 |

OTHER PUBLICATIONS

NetCloak Version 3.1 User's Guide: Serving Cloaked Files, 1996-2999, 3 page exerpt.*
"How to Prevent the Storing of File in the Hard Disk Cache"; http://www.web-caching.com/forums/Forum1/HTML/000233.html; Jun. 25, 2003.
"How Disk Caching Works in Java Plug-in"; http://java.sun.com/products/plugin/1.3/docs/cache.html; Jun. 25, 2003.

* cited by examiner

*Primary Examiner*—Wayne Amsbury

(57) ABSTRACT

A method for improving performance through selective file caching is disclosed. The caching policy of a client's browser cache is set to cache all files. Web page files that reference a dynamic file include JavaScript code that mangles the dynamic filename, such that a reference by the web page file to the dynamic file is unique each time a browser, processes the web page file. In one embodiment, the filename is mangled by appending to it a known string followed by a 12-digit timestamp. Consequently, the mangled filename misses in the cache, forcing the browser to fetch the dynamic file from the web server. The web server recognizes the filename is in the mangled format, regenerates the original filename, and returns the file to the client. Static filenames are not mangled; hence, they are satisfied from the browser cache. The method also works to selectively defeat network caching.

53 Claims, 11 Drawing Sheets

Web Browser Operation

Web Server Operation

Web Browser Operation

Web Browser Operation

Selective File Caching Operation Example

Selective File Caching Operation Example (cont.)

Selective File Caching Operation Example (cont.)

Fig. 7

Web Page Code Example page1.html:

```
1   // Include JavaScript source code file with mangling functions
2   <script language="JavaScript" src="mangle.js"></script>

...

11  // Mangle picDyn.jpg, create html code with reference to mangled filename,
12  //    and command browser to display created html
13  var timeDateStr = top.getTimeString();
14  var imageName = top.makePageName( "picDyn.jpg", timeDateStr, ".jpg" );
15  html += '<img src="' + imageName + '" width="200" height="200" align="left">';
16  document.write(html);

...

21  // command browser to display picStat.jpg
22  <img src="picStat.jpg" width="200" height="200" align="right">

...

31  // Mangle pageDyn.html, create html code with link to mangled name,
32  //    and command browser to display created html
33  var timeDateStr = top.getTimeString();
34  var linkName = top.makePageName( "pageDyn.html", timeDateStr, ".html" );
35  html+='To initialize the array, <a href="linkName"> click here</a>';
36  document.write(html);
``` pageDyn.html:

```
1   // Include JavaScript source code file with mangling functions
2   <script language="JavaScript" src="mangle.js"></script>

...

11  // Mangle picDyn.jpg, create html code with reference to mangled filename,
12  //    and command browser to display created html
13  var timeDateStr = top.getTimeString();
14  var imageName = top.makePageName( "picDyn.jpg", timeDateStr, ".jpg" );
15  html += '<img src="' + imageName + '" width="200" height="200" align="left">';
16  document.write(html);

...

21  // command browser to display picStat.jpg
22  <img src="picStat.jpg" width="200" height="200" align="right">
```

Fig. 8

Mangle.js JavaScript Source Code

```
function getTimeString()
{
    var currentDate = new Date();
    var curDate = currentDate.valueOf();
    var curDateStr = new String( curDate.toString() );
    var strLength = curDateStr.length;

if (strLength < 12)
    {   // Pad on left with 0s
        curDateStr = "000000000000" + curDateStr;
        strLength = curDateStr.length;
    } var returnDateStr = curDateStr.substring(strLength - 12);
    return returnDateStr;
} function makePageName( naturalName, timeStr, suffix )
{
    var inStr = new String(naturalName);
    var _ZPos = inStr.indexOf("_Z");
    if (_ZPos == -1)
    {   // No time on name - add one
        var dotPos = inStr.indexOf(suffix);
        var outStr = inStr.substring(0, dotPos) + "_Z" + timeStr + suffix;
    }
    else
    {   // is already a time - put a new time
        var outStr = inStr.substring(0, _ZPos) + "_Z" + timeStr + suffix;
    } return outStr;
}
```

Example

Natural filename input:     index.html
Mangled filename output:  index_Z123456789012.html

Fig. 9

Web Server Natural Filename Regeneration Code

```
void RegenerateHtmlFileName( sbyte * mangledName )
{
  int thisNameLength;

// Change the name if it meets the criteria: "/*_ZXXXXXXXXXXXX.html"
  // Look at the last 19 digits _ZXXXXXXXXXXXX.html
  thisNameLength = strlen(mangledName);
  if (thisNameLength > 20)
  {
     if ( (mangledName[thisNameLength - 19] == '_') && (mangledName[thisNameLength - 18] == 'Z') )
     {   // Remove the _ZXXXXXXXXXXXX
         mangledName[thisNameLength - 19] = '.';
         mangledName[thisNameLength - 18] = 'h';
         mangledName[thisNameLength - 17] = 't';
         mangledName[thisNameLength - 16] = 'm';
         mangledName[thisNameLength - 15] = 'l';
         mangledName[thisNameLength - 14] = 0;   // Terminate
     }
  }
}
```

Exam

Mangled filename input:              index_Z987654321098.html
Regenerated Natural filename output: index.html

SELECTIVE FILE CACHING METHOD

FIELD OF THE INVENTION

This invention relates in general to the field of web applications and particularly to caching of files transferred by a web server to a web client.

BACKGROUND OF THE INVENTION

A web browser is a computer program used for accessing sites or information on a network, such as the World Wide Web (WWW). Some of the more commonly used web browsers are Microsoft Internet Explorer®, Netscape Navigator®, Opera®, Mozilla®, and Apple Safari®. A client computer is a computer that executes a web browser. A web page is one or more files containing information that may be displayed on a client computer by a web browser. A web server is a computer in the network to which the client computer is connected that stores web page files.

A web browser user accesses a web page by providing input, such as keyboard or mouse input, which specifies the desired web page. The input is a universal resource locator (URL), commonly referred to as a web page address. An example of a web page URL is http://www.google.com. Another example of a URL is simply an Internet Protocol (IP) address of the web server, such as http://216.239.36.10. Yet another example of a URL is the address of a specific file on a web server, such as http://yourfavoriteserver.com/index.html. A hypertext link, or link, is text or an image displayed by a web browser that has a URL associated with it. When a user clicks on a link, the user is requesting the web browser to access the file or web page referred to by the URL associated with the link. A hypertext transfer protocol (http) request is a request issued by a web browser onto the network to retrieve from a web server a file specified by the URL.

A web page may be comprised of many individual files that must be transferred over the network from the web server to the client computer. A common type of web page file is a hypertext markup language (HTML or html) file. HTML is a programming language used to create web pages. In addition to html code, an html file may also include code in other programming languages, such as JavaScript® or VBScript®. Another common type of web page file is an image or graphics file, such as a .gif, .jpg, or .pdf file. Other types of web page files are audio, video, and applet files. When a web browser parses an html file, it may encounter a reference to another file on the web server, such as a graphics file or a JavaScript file.

Consider the following web page named index.html, which contains html source code and references to two external graphics files referred to as picture_A.jpg and picture_B.jpg. A user points his browser at http://www.yourfavoritewebserver.com/index.html. The web browser issues to the web server an http request on the network for index.html. The web server returns index.html to the client computer. The browser parses through the code contained in index.html and determines the index.html code references picture_A.jpg and picture_B.jpg on the web server. In response, the browser issues an http request for picture_A.jpg, the web server returns picture_A.jpg, and the browser displays picture_A.jpg; the browser issues an http request for picture_B.jpg, the web server returns picture_B.jpg, and the browser displays picture_B.jpg.

Web browser users are familiar with the relatively long delay experienced when waiting for a web page to be loaded from the web server and displayed on the client, computer. One cause of the delay is the slow transfer speed of data across the network relative to the data transfer rates from the client computer disk drive, for example. The client computer may be connected to the network by a 56K modem, for example, which has relatively slow data transfer speed. Even if the client computer is connected to the network via a faster medium, such as cable modem or a T1 connection, some of the web page files which must be transferred over the network from the web server to the client are so large, such as some image files, that they require a relatively long time to transfer even at high transfer rates.

To reduce the delay, web browsers typically employ a cache, referred to as a browser cache, on a mass storage device of the client computer, such as a disk drive. When a browser retrieves a file from a web server, the browser saves a copy of the file in the browser cache. The next time the file is requested, the browser checks the browser cache to see if the requested file is present in the cache. A query to the browser cache revealing the file is hot present is referred to as a cache miss. A query to the browser cache revealing the file is present is referred to as a cache hit. If the file hits in the cache, then the browser can satisfy the request for the file from its cache instead of issuing an http request on the network to the web server. In the example above, index.html, picture_A.jpg, and picture_B.jpg will all be cached in the browser cache after being returned by the web server. Future accesses to these files may be satisfied from the browser cache, thereby alleviating the need to incur again the potentially long delays associated with transferring the files from the web server across the network.

However, the information in web page files transferred from a web server to a client may be classified into two categories with respect to file caching. A static file is a file whose content does not change. A common example of a static file is an image file. A dynamic file is a file whose content may change. An example of a dynamic file is an html file that contains changing content, such as player statistics of a basketball game in progress, or stock market sales price information. Caching of static files is beneficial. However, caching of dynamic files may result in undesirable operation since the user may receive stale or out-of-date information.

Current browser caching technology does not handle the distinction between static files and dynamic files well. For example, Internet Explorer enables a user to choose from four caching policy settings. A first setting specifies that when the user returns to a previously viewed web page, the browser checks with the web server for changes to the page since the page was last accessed. That is, the browser ignores its cache and issues a new http request for all the files making up the web page. A second setting specifies that when the user returns to a previously viewed web page, the browser never checks with the web server for changes to the page. That is, the web browser always look to its cache for all requested files, and never makes a new request for a file that hits in the browser cache, even though it may be possible that a newer version of the file exists on the web server, i.e., even though the file's contents may have changed. With this setting, the user must click on the Refresh button to force the web server to be re-accessed. A third setting specifies that when the user returns to a previously viewed web page, the browser does not check with the web server unless the previous visit was in an earlier session of the browser or on a previous day. The fourth setting is similar to the third setting, except that if the browser determines that the files on the page are changing infrequently, the browser checks with the web server even less frequently. Other browsers include a setting that allows the user to specify an age; if the cached version of the file is older than the specified age, the browser accesses the server rather than satisfying the request out of the cache.

As may be seen from the discussion above, current browsers employ a limited ability to determine whether an entire web page and its associated files should or should not be cached. However, the present inventors are not aware of a web browser that has the ability to determine which individual files that make up a web page must be re-fetched from the web server in order to display the current content of the web page. That is, the browser does not have the ability to determine which files of a web page are static and which are dynamic. The inability to distinguish between static and dynamic web page files may be detrimental to dynamic web application performance since the user must set the browser caching policy to disable caching in order to avoid receiving stale data, which forces all the web page files to be re-fetched from the web server. However, in some applications a large percentage of the web page content may be contained in static files that could be satisfied from the cache, and the web page files that are dynamic may constitute only a small percentage of the data that must be transferred from the server to the client.

Using the example above, assume index.html is a 4 KB dynamic file, and that picture_A.jpg and picture_B.jpg are each static 2 MB files. If a distinction could be made between static and dynamic files, the browser could satisfy subsequent requests for picture_A.jpg and picture_B.jpg from its cache, and re-fetch only index.html from the server, thereby potentially improving performance substantially.

Therefore what is needed is a method for selectively defeating browser caching on a file-by-file basis so that dynamic files are obtained from the web server, while static files are quickly obtained from the browser cache, thereby improving overall performance.

Another limitation of current web browser caching technology with respect to a web page that includes both static and dynamic files is that it does not provide an ability to control file caching that may be performed by other computers in the network between the client computer and the web server.

Therefore what is also needed is a method for selectively defeating network file caching on a file-by-file basis so that dynamic files are obtained from the web server while static files are quickly obtained from the browser cache, thereby improving overall performance.

SUMMARY

The present invention provides a method and network for altering dynamic filenames such that they miss in a browser cache and network cache, and then having the web server regenerate the altered filename into the original filename on the web server. In one aspect, the present invention provides a method for improving web application performance through selective file caching in a browser cache. The method includes altering a first filename to create a second filename. The first filename specifies a file on a web server. The second filename has a high probability of missing in the browser cache. The method also includes issuing a request to the web server for the second filename.

In another aspect, the present invention provides a method for achieving selective file caching in a browser cache of a client computer. The method includes a web server receiving http requests from the client computer. Each of the http requests includes a filename. The method also includes determining for each http request whether the filename is an altered form of an original filename specifying a file on the web server, the original filename having been altered to avoid the second filename hitting in the browser cache. The method also includes regenerating the original filename from the filename included in the http request, if the filename is an altered form of the original filename.

In another aspect, the present invention provides a method for effecting selective file caching in a web browser cache. The method includes a client computer setting a cache policy of the browser cache to cache all files whenever possible, and mangling a natural filename to create a mangled filename. The natural filename refers to a file on a web server. The method also includes the client computer issuing to the web server an http request for the mangled filename. The method also includes the web server receiving the http request, regenerating the natural filename from the mangled filename, and returning to the client computer the file referred to by the natural filename.

In another aspect, the present invention provides a computer network. The computer network includes a web server that stores a first file having static content and a first filename, and second file having dynamic content and a second filename. The computer network also includes a client computer, coupled to the web server, having a browser cache. The client computer is configured to satisfy a request for the first file from the browser cache. The client computer is also configured to issue to the web server an http request for the second file using a mangled version of the second filename, which is mangled to miss in the browser cache. The web server is configured to regenerate the second filename from the mangled filename and return the second file to the client computer, in response to the http request.

An advantage of the present invention is that it improves the performance of web applications running on client web browsers by virtue of its selective caching method. Advantageously, the present invention achieves the performance increase by working with off-the-shelf browsers without requiring modification to the browser, other than setting the caching policy of the browser. Another advantage of the present invention is that it also defeats network level file caching for files with dynamic content, in addition to defeating web browser caching.

Other features and advantages of the present invention will become apparent upon study of the remaining portions of the specification and drawings.

BRIEF DESCRIPTION OF THE DRAWINGS

FIG. 7 is a partial source code listing of two HTML files used in the example of FIG. 6 according to the present invention.

FIG. 8 is a partial JavaScript source code listing of functions used to create a mangled filename according to the present invention.

FIG. 9 is a partial C language source code listing of a function used to regenerate a mangled filename to its corresponding natural filename according to the present invention.

DETAILED DESCRIPTION

Figure 1:
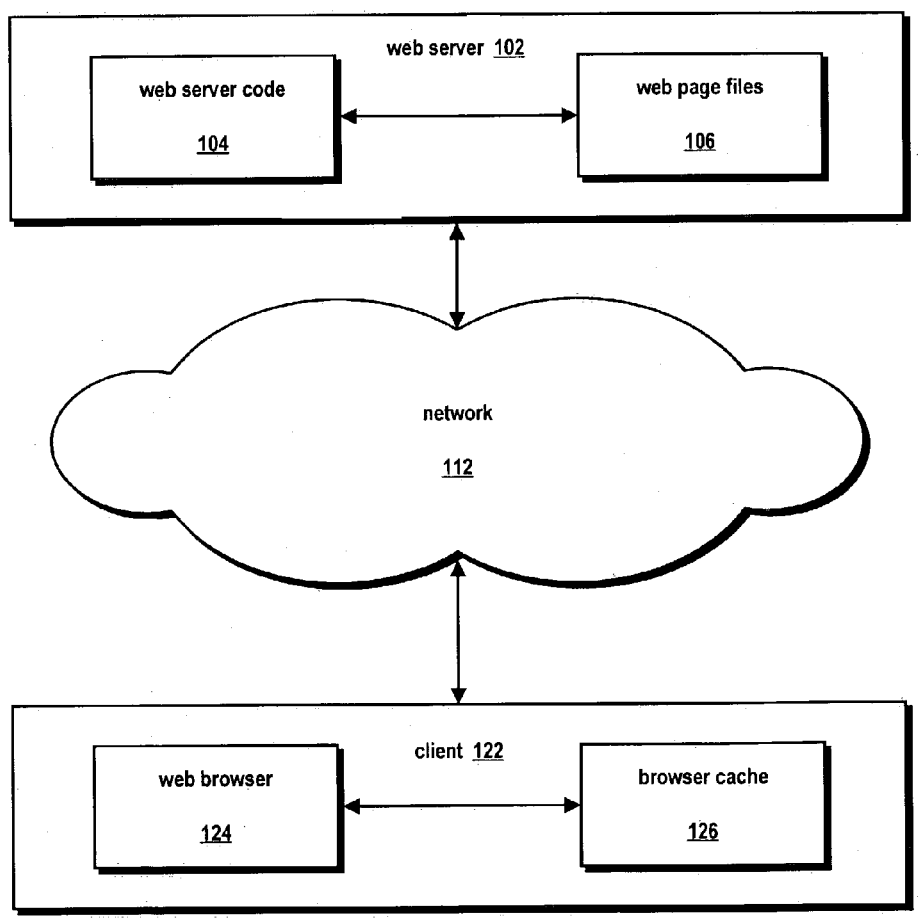
FIG. 1 is a block diagram of a computer network according to the present invention.

Referring now to FIG. 1, a block diagram of a computer network 100 according to the present invention is shown. The computer network 100 includes a client computer 122 and web server 102 coupled a network 112. Client computer 122 includes a web browser 124 and a browser cache 126, described in more detail below. Web server 102 includes web server code 104 and web page files 106, described in more detail below. In one embodiment, the network 112 comprises the world-wide-web (WWW). However, network 112 may be any network for enabling two or more computers to communicate with one another. In one embodiment, the client 122 and the web server 102 communicate by transmitting and receiving internet protocol (IP) packets. Web server 102 and client computer 122 may be coupled to network 112 by any of various means, including twisted pair telephone wires, cable, Ethernet, Fibre Channel, Infiniband (IB), Token Ring, Arcnet, FDDI, LocalTalk, or ATM.

Client computer 122 comprises any of various computer systems configurable to execute web browser 124 and to store web page files in browser cache 126. Examples of computer systems configurable to execute web browser 124 include personal computers, notebook computers, workstation computers, mainframe computers, handheld computers, pocket PCs, personal digital assistants, and the like.

Web browser 124 maintains browser cache 126 of web page files 106 previously fetched from web server 102, as well as of files received from other web servers coupled to network 112. Web browser 124 enables a user to set a caching policy for browser cache 126 similar to the caching policies described above. In particular, web browser 124 enables a user to set the caching policy to a highest level, or most aggressive caching policy. That is, the web browser 124 always looks to browser cache 126 for web page files, and never makes a new request to web server 102 for web page files 106 for files that hit in browser cache 126. Advantageously, the present invention operates with popular commercially available web browsers, such as Internet Explorer and Netscape Navigator.

Web server 102 comprises any of various computer systems configurable to store web page files 106 and to execute web server code 104. The web page files 106 comprise any of various file types such as HTML files, script files (such as JavaScript or VBScript), image or graphics files, applet files, audio files, video files, and the like. In one embodiment, web page files 106 are stored in a filesystem maintained by web server 102. In one embodiment, the web page files 106 are stored on a mass storage device, such as a disk drive. In another embodiment, the web page files 106 are stored on a solid-state storage device, such as a flash memory device.

In one embodiment, web server 102 comprises any of various general purpose computer systems, such as personal computers, notebook computers, workstation computers, mainframe computers, handheld computers, pocket PCs, personal digital assistants, and the like. In one embodiment, web server 102 runs a network operating system, such as Windows NT®, Novell NetWare®, or Linux®.

In another embodiment, web server 102 comprises a management controller in a mass storage controller, such as a redundant array of inexpensive disks (RAID) controller. The management controller comprises an embedded microprocessor running an embedded real time operating system, such as VxWorks® by Wind River International®. Web server 102 enables a user to manage and monitor the RAID controller. For example, web server 102 enables a user to configure one or more physical disk drives into one or more logical drives by selecting the number of physical disk drives to be included in a logic drive, to configure the RAID level of the logical drive, and to replace failed physical disk drives and repair a logical drive after replacement of a failed drive. Web server 102 also enables the user to monitor status of the controller and drives, such as drive temperature or failure, logical drive initialization status, etc. Consequently, many of the web page files 106 on web server 102 are dynamic files since they contain content that is changing.

Web server code 104 receives http requests issued by web browser 124 for web page files 106 via network 112 and returns the requested files 106 to client computer 122 via network 112. In particular, web server code 104 is configured to recognize http requests for web page files 106 wherein the filename of the requested web page file 106 has been mangled in order to defeat file caching by browser cache 126, and to regenerate the original filename, referred to herein as the natural filename, of the requested web page files 106, as described in detail below. In one embodiment, web server code 104 receives an individual http request from client computer 122 for a single one of web page files 106, and returns the requested web page file 106 to client computer 122.

Figure 2:
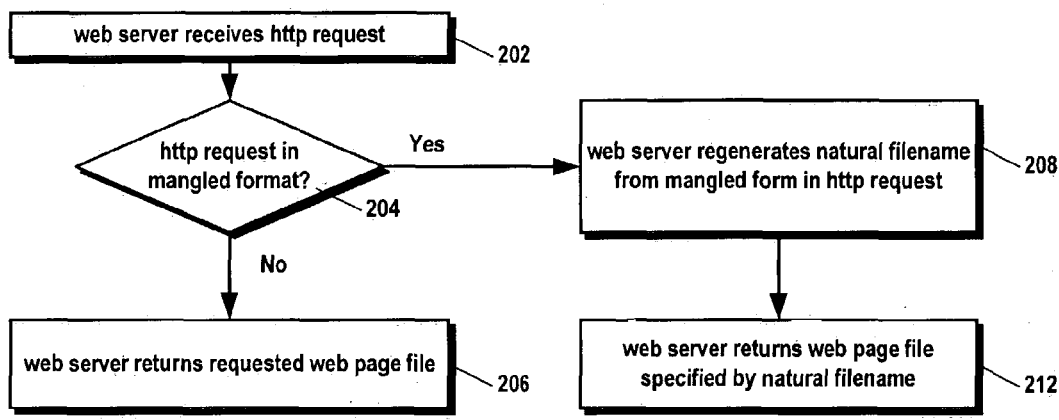
FIG. 2 is a flowchart illustrating operation of the web server of FIG. 1 according to the present invention.

Referring now to FIG. 2, a flowchart illustrating operation of web server 102 of FIG. 1 according to the present invention is shown. Flow begins at block 202.

At block 202, web server 102 receives an http request from network 112, such as from client computer 122 of FIG. 1. Flow proceeds to decision block 204.

At decision block 204, web server code 104 determines whether the filename portion of the http request is in a mangled format. If so, flow proceeds to block 208; otherwise flow proceeds to block 206.

The mangled format is determined from the manner in which the natural filenames of web page files 106 are mangled. In the present disclosure, mangling a filename is altering the filename into a mangled filename such that the mangled filename has a very high likelihood of missing in a cache (such as browser cache 126 of FIG. 1 or in network cache 1036 of FIG. 10), and such that the natural filename may be regenerated from the mangled filename.

In one embodiment, a natural filename is mangled by appending 14 characters to the root portion of the natural filename. The root portion comprises the portion of the filename up to but not including the "." and the suffix. For example, the root of the filename "index.html" is "index". In one embodiment, the 14 appended characters are "_Z" followed by a unique 12-digit timestamp. In one embodiment, the timestamp is obtained from the operating system running on client computer 122. Another embodiment is contemplated as described below, in which the timestamp is obtained from the operating system running on web server 102. In one embodiment, the timestamp specifies the number of seconds elapsed from Jan. 1, 1970 until the current date and time.

In one embodiment, the natural filename is mangled according to the function makePageName( ) shown in FIG. 8. FIG. 8 also shows an example of how natural filename index.html is mangled into a mangled filename. Hence, in the mangling embodiment of FIG. 8, web server code 104 determines whether the filename comprises one or more characters followed by "_Z" and twelve other characters followed by a "." and a suffix.

At block 206, web server 102 returns the web page file 106 requested in the http request to client computer 122. That is, web server 102 transmits to client computer 122 via network 112 the requested web page file 106 as specified by the filename in the http request. Flow ends at block 206.

At block 208, web server code 104 takes the filename in the http request recognized to be in the mangled format and regenerates the natural filename from the mangled filename. In one embodiment, web server code 104 regenerates the natural filename from the mangled filename according to the C language function RegenerateHtmlFileName( ) shown in FIG. 9. The function RegenerateHtmlFileName( ) regenerates a natural html filename from a mangled html filename. As discussed below with respect to the remaining Figures, web server code 104 also regenerates natural filenames for other file types, such as image files (e.g., .jpg, .gif, .tiff, .pdf, etc.), applet files, audio files, and video files. The function RegenerateHtmlFileName( ) is representative of other functions employed by web server code 104 to regenerate filenames of other types. Flow proceeds to block 212.

At block 212, web server 102 returns to client computer 122 the web page file 106 specified by the regenerated filename. Flow ends at block 212.

Figure 3:
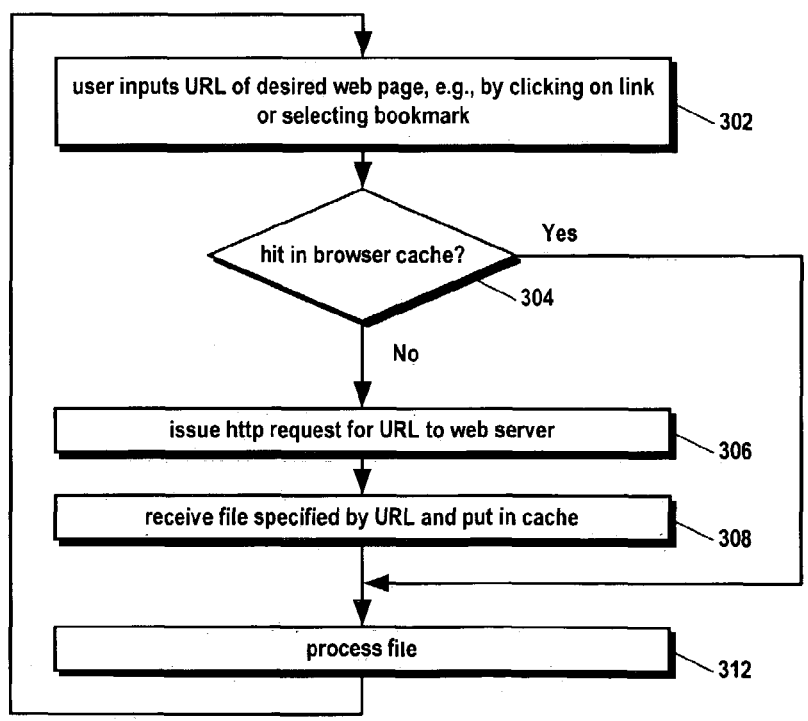
FIG. 3 is a flowchart illustrating operation of the web browser of FIG. 1 according to the present invention.

Referring now to FIG. 3, a flowchart illustrating operation of web browser 124 of FIG. 1 according to the present invention is shown. Flow beings at block 302.

At block 302, a user inputs a URL of a desired web page, for example, by clicking on a displayed link or by selecting a bookmarked website or by typing a URL into the website address window of web browser 124. In particular, the user may click on a link to a URL including a mangled filename generated according to FIGS. 5 through 8 as described below. Flow proceeds to decision block 304.

At decision block,304, web browser 124 determines whether the input URL hits in browser cache 126 of FIG. 1. If so, flow proceeds to block 312; otherwise, flow proceeds to block 306.

At block 306, web browser 124 issues an http request to web server 102 of FIG. 1 for the specified URL that missed in: browser cache 126. Flow proceeds to block 308.

At block 308, web browser 124 receives the file specified in the http request and enters the file into browser cache 126. Flow proceeds to block 312.

At block 312, web browser 124 processes the received file. Flow ends at block 312. Block 312 is described in more detail below with respect to FIG. 4.

Figure 4:
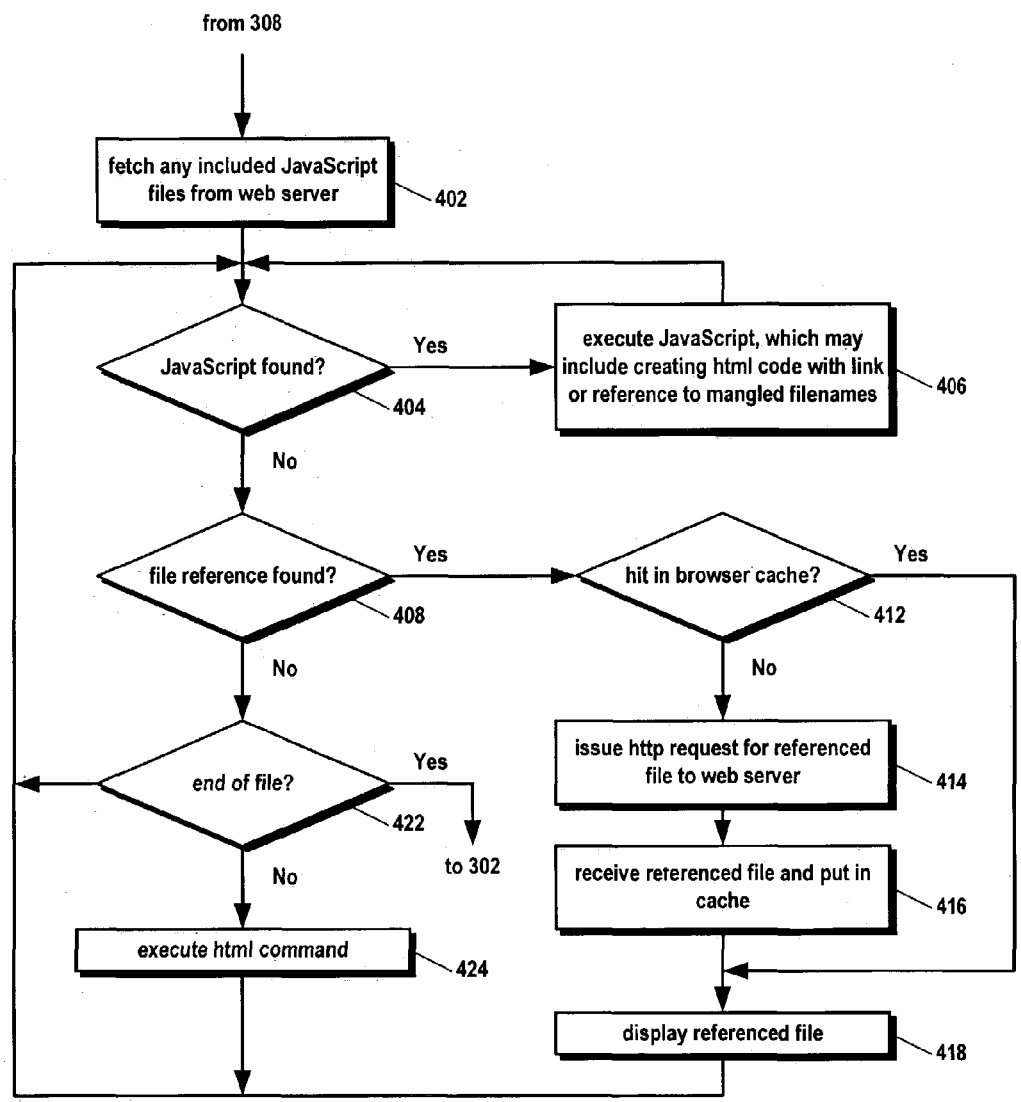
FIG. 4 is a flowchart illustrating block 312 of FIG. 3 in detail according to the present invention.

Referring now to FIG. 4, a flowchart illustrating block 312 of FIG. 3 in detail according to the present invention is shown. Flow proceeds to block 402 of FIG. 4 from block 308 of FIG. 3.

At block 402, web browser 124 scans the file for included script files, such as JavaScript files, and fetches the script files from web server 102 of FIG. 1. An example of an included JavaScript file, denoted mangle.js, in an html web page file is shown in line 2 of page1.html of FIG. 7. Flow proceeds to decision block 404.

At decision block 404, web browser 124 parses the next line of the file (i.e., the file either received from web server 102 at block 308 of FIG. 3 or found in browser cache 126 at block 304 of FIG. 3) to determine if it is script code, such as JavaScript code. If so, flow proceeds to block 406; otherwise flow proceeds to decision block 408.

At block 406, web browser 124 executes the found line of script code. In particular, the script code may be script code that dynamically creates html code with a reference to a mangled filename, such as an html link or a referenced image, applet, audio, or video file, as described below with respect to FIG. 5 and to the JavaScript code at lines 13–16 and 33–36 of FIG. 7, for the purpose of defeating browser cache 126, according to the present invention. Flow returns to decision block 404 to parse the next line of the file.

At decision block 408, web browser 124 parses the next line of the file to determine if it includes a reference to a web page file, such as web page files 106 of FIG. 1. If so, flow proceeds to decision block 412; otherwise flow proceeds to decision block 422. In particular, the line including a reference to a web page file may be a line of html code created at block 406 referencing a dynamic web page file with a mangled filename to defeat file caching. Or, the line including the reference to a web page file may be a line of standard html code such as line 22 of FIG. 7 referring to a static web page file.

At decision block 412, web browser 124 determines whether the referenced file hits in browser cache 126 of FIG. 1. In particular, the referenced file may have a mangled filename for the purpose of missing in browser cache 126. If the referenced file hits in browser cache 126, flow proceeds to block 418; otherwise, flow proceeds to block 414.

At block 414, web browser 124 issues to web server 102 an http request for the referenced file. In particular, the http request for the referenced file may include a mangled filename which must be regenerated by web server 102 according to FIG. 2. Flow proceeds to block 416.

At block 416, web browser 124 receives the referenced file and enters the referenced file into browser cache 126. Flow proceeds to block 418.

At block 418, web browser 124 displays the referenced file. In the case of a referenced html file, displaying the referenced file comprises parsing and executing the html file. In the case of a referenced image file, displaying the referenced file comprises displaying the image file on a display of client computer 122. In the case of a referenced applet file, displaying the referenced file comprises executing the applet file. In the case of a referenced audio or video file, displaying the referenced file comprises playing the audio or video file. Flow returns to decision block 404 to parse the next line of the file.

At decision block 422, web browser 124 determines whether the end of the file has been reached. If so, flow proceeds to block 302 of FIG. 3 to await the next user input; otherwise, flow proceeds to block 424.

At block 424, web browser 124 executes the html command in the line of the file. Herein, executing an html command or code is understood to mean interpreting and displaying an html command or code. Flow returns to decision block 404 to parse the next line of the file.

Figure 5:
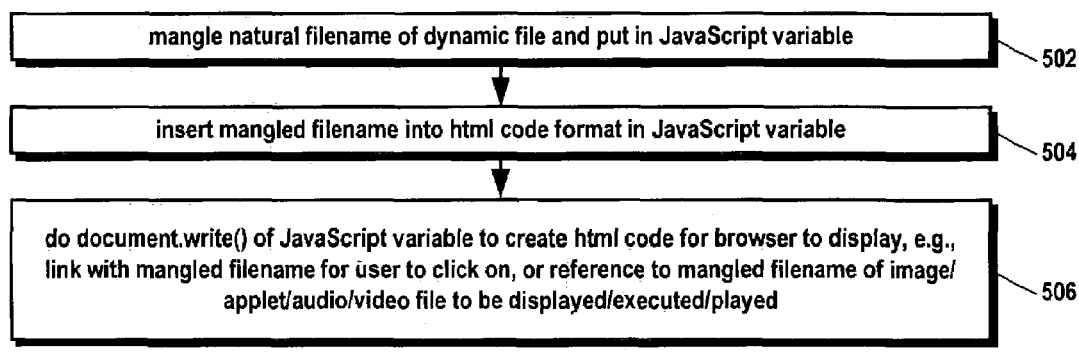
FIG. 5 is a flowchart of illustrating script code, such as JavaScript code, in a web page file, such as the web page files of FIG. 1, creating HTML code including a mangled filename according to the present invention.

Referring now to FIG. 5, a flowchart of illustrating script code, such as JavaScript code, in a web page file, such as web page files 106 of FIG. 1, creating HTML code including a mangled filename according to the present invention is shown. Flow begins at block 502.

At block 502, the script code mangles a natural filename of a dynamic file of web page files 106 of FIG. 1, and puts the mangled filename in a script variable. Lines 14 and 34 of FIG. 7 are examples of JavaScript code that perform block 502 using a timestamp obtained in lines 13 and 33, respectively. The functions getTimeString( ) and makePageName( ) called in FIG. 7 are shown in FIG. 8. The reference to "top" in FIG. 7 is to the top-most web page, which in one embodiment is index.html. In one embodiment, index.html includes mangle.js such as shown in page1.html at line 2 of FIG. 7. In one embodiment, index.html employs the frames capability of HTML to instantiate two frames. The first frame is a content panel frame that is a visible portion on the client computer 122 display. The second frame is a non-user-visible control frame that performs housekeeping functions and an auto-refresh function. The script code remains loaded for access by other HTML files by virtue of the control frame. Flow proceeds to block 504.

At block 504, the script code inserts into a script variable the mangled filename just created into html code format. Lines 15 and 35 of FIG. 7 are examples of JavaScript code that perform block 504. The JavaScript variable "html" in lines 15 and 35 was declared earlier in the file. Flow proceeds to block 506.

At block 506, the script code calls a document.write( ) JavaScript function with the script variable created at block 504 to create HTML code for web browser 124 to display, such as at block 418 of FIG. 4. The document.write(html) statement has the effect of writing the text string contained in the JavaScript variable "html" to a specific display window. Since the variable "html" contains properly formed HTML, it will be displayed correctly by web browser 124. For example, web browser 124 may display HTML code which is a link for the user to click on with an associated mangled filename, such as at block 302 of FIG. 3. Or web browser 124 may display HTML code which is a reference to a mangled filename of an image, applet, audio, or video file to be displayed, executed, or played, such as at block 418 of FIG. 4. Examples of JavaScript code that calls document.write( ) are lines 16 and 36 of FIG. 7. Flow ends at block 506.

An embodiment is contemplated in which the steps of FIG. 5 are performed by the web server code 104 of FIG. 1. That is, whenever a client requests a web page file 106, web server code 104 dynamically modifies the requested web page file 106 by mangling all references to dynamic files in the web page file 106 before returning the file 106 to the requesting client. Hence, when the web browser 124 processes the modified file 106, the browser cache 126 and/or network cache are defeated similar to the embodiment described with respect to FIG. 5.

Figure 6A:
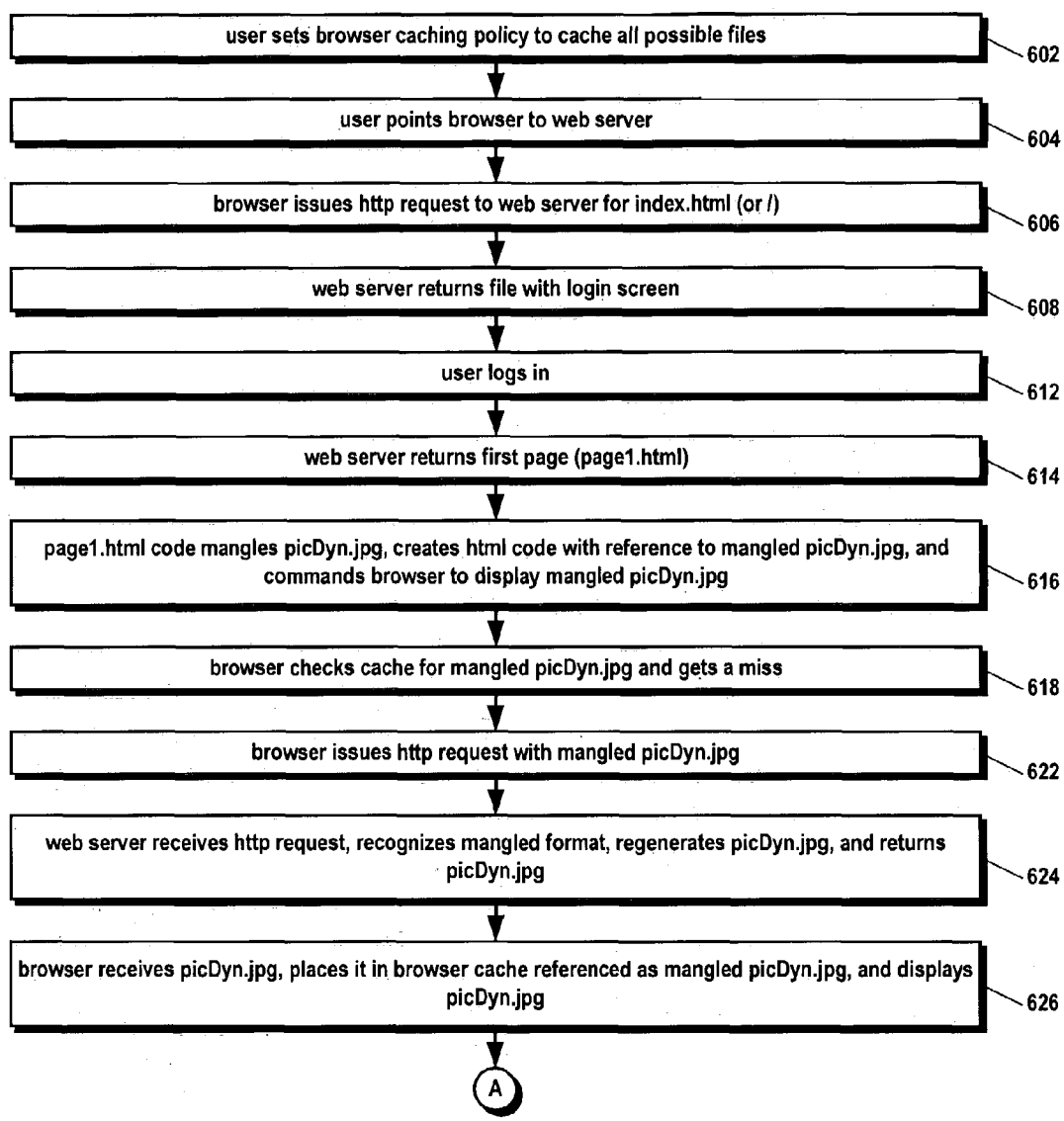
FIG. 6 is a flowchart illustrating an example of selective file caching operation according to the present invention.
Figure 6B:
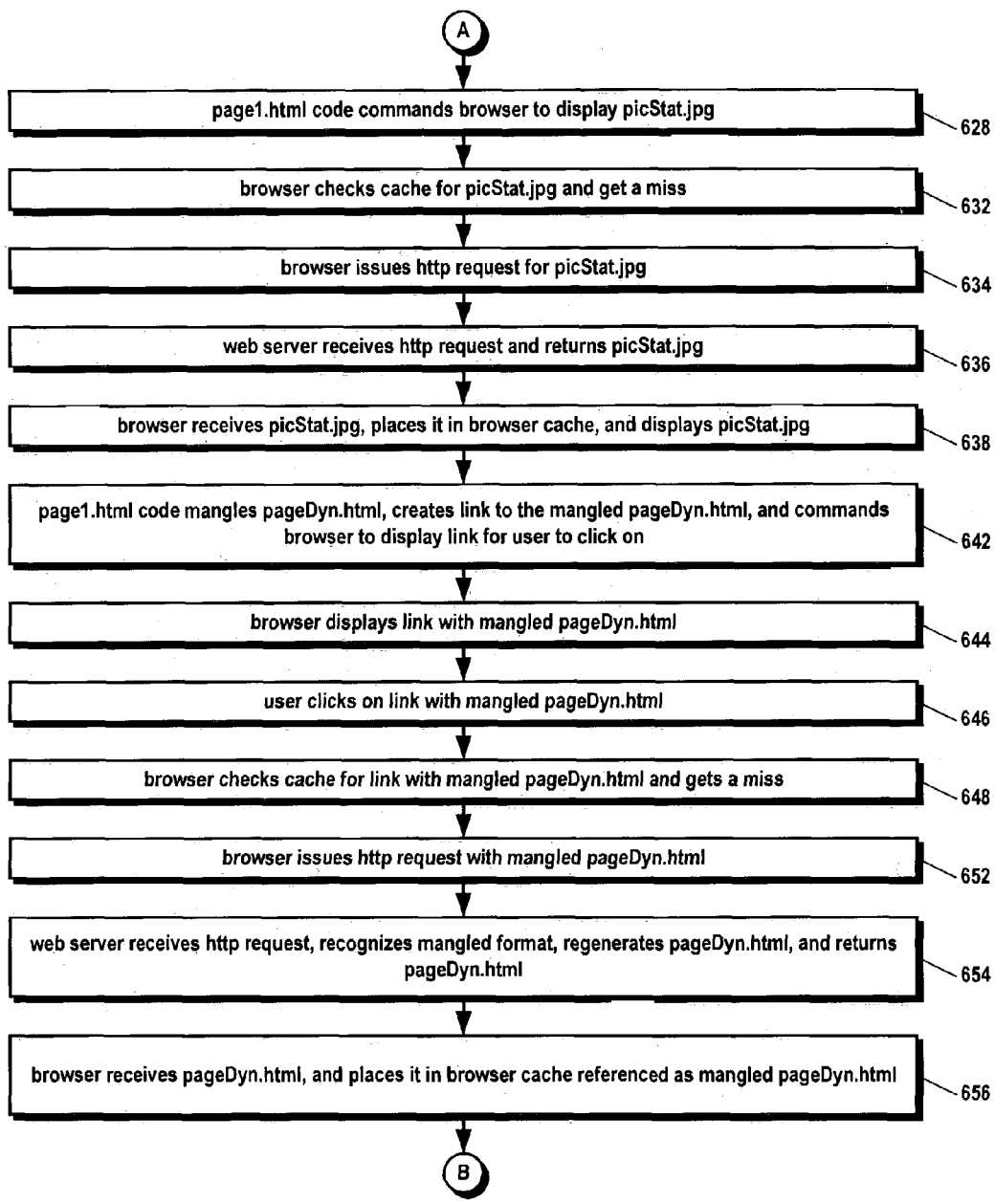
Figure 6C:
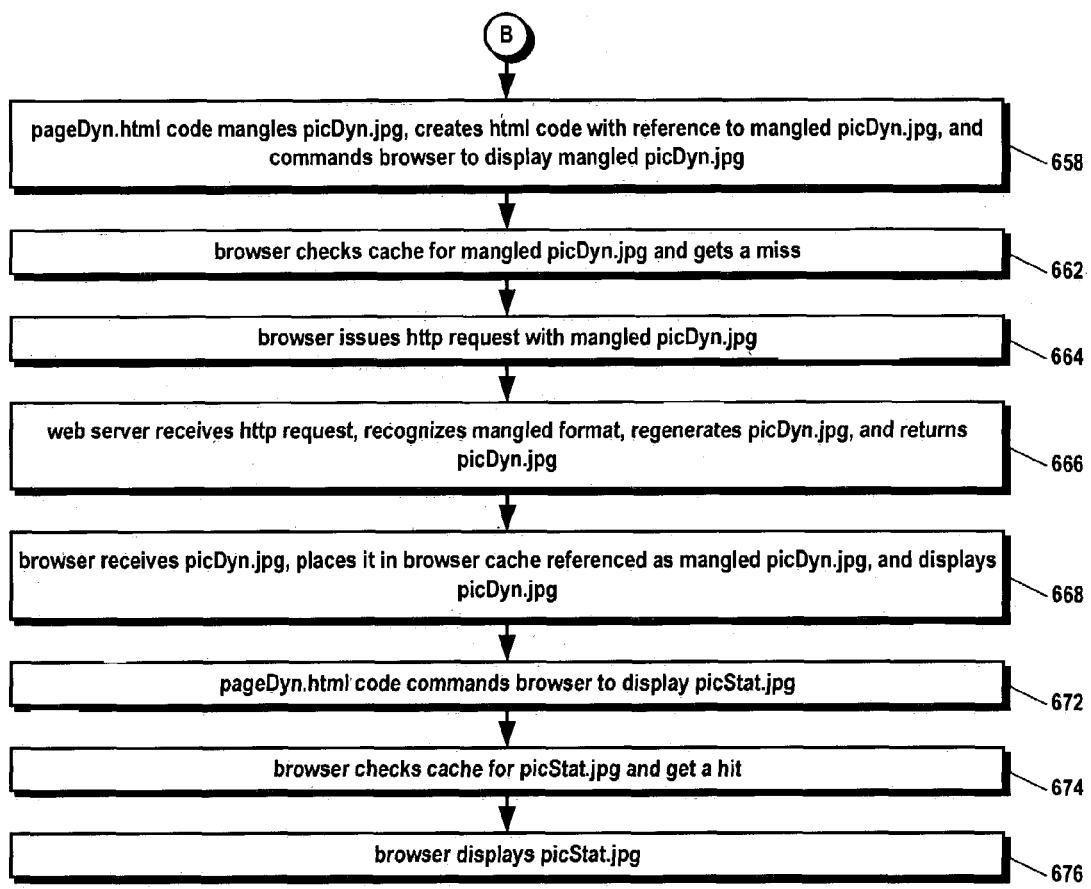

Referring now to FIG. 6, a flowchart illustrating an example of selective file caching operation according to the present invention is shown. FIG. 6 comprises FIGS. 6A, 6B, and 6C, referred to collectively as FIG. 6. In the example, browser cache 126 of FIG. 1 is initially empty. Flow begins at block 602.

At block 602, the user sets the web browser 124 caching policy to the highest caching level, such as the "Never" setting of Internet Explorer, i.e., to always cache files whenever possible. Flow proceeds to block 604.

At block 604, the user points web browser 124 to web server 102 of FIG. 1, according to block 302 of FIG. 3. Flow proceeds to block 606.

At block 606, web browser 124 issues an http request to web server 102 for index.html or for / (the default web page file), according to block 306 of FIG. 3. Flow proceeds to block 608.

At block 608, web server 102 returns a web page file 106 with a login screen to force the user to login. In one embodiment, web server 102 always requires a user to login before navigating, which prevents an unauthorized user from accessing web server 102 in the embodiment in which web server 102 is an I/O controller. Additionally, requiring a user to login before navigating web server 102 advantageously prevents the user from circumventing the selective file caching of the present invention by directly accessing a web page file, i.e., by directly pointing the browser to the URL of one of the web page files 106. Flow proceeds to block 612.

At block 612, the user logs in. Flow proceeds to block 614.

At block 614, web server 102 returns the first page in response to the user logging in. In the example of FIG. 6, page1.html is the first page. Relevant portions of page1.html are shown in FIG. 7. Flow proceeds to block 616.

At block 616, web browser 124 executes lines 13–16 of page1.html to mangle the filename of picDyn.jpg (which is a dynamic image file), create a line of HTML code with a reference to the mangled filename just created for image file picDyh.jpg, and write out the line of HTML code to display the mangled filename, according to block 406 of FIG. 4. Flow proceeds to block 618.

At block 618, web browser 124 checks to see if the mangled filename created at block 616 hits in browser cache 126, according to block 412 of FIG. 4, and gets a miss. Flow proceeds to block 622.

At block 622, web browser 124 issues an http request for the mangled filename created at block 616, according to block 414 of FIG. 4. Flow proceeds to block 624.

At block 624, web server 102 receives the http request, recognizes that the filename included in the request is in the mangled format, regenerates the natural filename picDyn.jpg, and returns the file picDyn.jpg to client computer 122, according to blocks 202, 204, 208, and 212 of FIG. 2. Flow proceeds to block 626.

At block 626, web browser 124 receives picDyn.jpg from web server 102, places it in browser cache 126, and displays picDyn.jpg on the screen of client computer 122, according to blocks 416 and 418 of FIG. 4. It is noted that the contents of file picDyn.jpg are referred to in browser cache 126 with the mangled filename generated at block 616. FIG. 6A shows the contents of browser cache 126 after block 626 as having picDyn_Z012345678901.jpg. It is noted that files are stored in browser cache 126 according to their entire URL. That is, browser cache 126 references files using the web server 102 address and directory pathname to the cached file along with the filename. This serves to avoid a hit in browser cache 126 for two files with the same filename from two distinct web servers. Flow proceeds to block 628.

At block 628, web browser 124 processes line 22 of page1.html of FIG. 7, which commands web browser 124 to display picstat.jpg. Flow proceeds to block 632.

At block 632, web browser 124 checks to see if picstat.jpg hits in browser cache 126, according to block 412, and gets a miss. Flow proceeds to block 634.

At block 634, web browser 124 issues an http request for picstat.jpg, according to block 414. Flow proceeds to block 636.

At block 636, web server 102 receives the http request, recognizes that the filename included in the request is not in the mangled format, and returns the file picstat.jpg to client computer 122, according to blocks 202, 204, and 206 of FIG. 2. Flow proceeds to block 638.

At block 638, web browser 124 receives picstat.jpg from web server 102, places it in browser cache 126, and displays picstat.jpg on the screen of client computer 122, according to blocks 416 and 418. FIG. 6B shows the contents of browser cache 126 after block 638 as having picDyn_Z012345678901.jpg and picStat.jpg. Flow proceeds to block 642.

At block 642, web browser 124 executes lines 33–36 of page1.html to mangle the filename of pageDyn.html (which is a dynamic HTML file), create a line of HTML code with a link to the mangled filename just created, and write out the line of HTML code to display the mangled filename, according to block 406 of FIG. 4. Flow proceeds to block 644.

At block 644, web browser 124 displays the link created at block 642 on client computer 122. Flow proceeds to block 646.

At block 646, the user clicks on the link displayed at block 644. Flow proceeds to block 648.

At block 648, web browser 124 checks to see if the link created at block 642 hits in browser cache 126, according to block 412, and gets a miss. Flow proceeds to block 652.

At block 652, web browser 124 issues an http request for the link created at block 642, according to block 414. Flow proceeds to block 654.

At block 654, web server 102 receives the http request, recognizes that the filename included in the request is in the mangled format, regenerates the natural filename pageDyn.jpg, and returns the file pageDyn.jpg to client computer 122, according to blocks 202, 204, 208, and 212. Flow proceeds to block 656.

At block 656, web browser 124 receives pagedyn.jpg from web server 102 and places it in browser cache 126, according to block 416. It is noted that the contents of file pagedyn.jpg are referred to in browser cache 126 with the mangled filename generated at block 646. FIG. 6B shows the contents of browser cache 126 after block 656 as having picDyn_Z012345678901.jpg, picstat.jpg, and pageDyn_Z012345678915.html. Flow proceeds to block 658.

At block 658, web browser 124 executes lines 13–16 of pageDyn.html to mangle the filename of picDyn.jpg, create a line of HTML code with a reference to the mangled filename just created for image file picDyn.jpg, and write out the line of HTML code to display the mangled filename, according to block 406. It is noted that the mangled filename created for picDyn.jpg at block 658 is different from the mangled filename created for picDyn.jpg at block 616 since the timestamp generated during the execution of line 13 of page1.html is different from the timestamp, generated during the execution of line 13 of pageDyn.html at block 658. Flow proceeds to block 662.

At block 662, web browser 124 checks to see if the mangled filename created at block 658 hits in browser cache 126, according to block 412, and gets a miss. Flow proceeds to block 664.

At block 664, web browser 124 issues an http request for the mangled filename created at block, 658, according to block 414. Flow proceeds to block 666.

At block 666 web server 102 receives the http request, recognizes that the filename included in the request is in the mangled format, regenerates the natural filename picDyn.jpg, and returns the file picDyn.jpg to client computer 122, according to blocks 202, 204, 208, and 212 of FIG. 2. Flow proceeds to block 668.

At block 668, web browser 124 receives picDyn.jpg from web server .102, places it in browser cache 126, and displays picDyn.jpg on the screen of client computer 122, according to blocks 416 and 418. It is noted that the contents of file picDyn.jpg are referred to in browser cache 126 with the mangled filename generated at block 658. FIG. 6C shows the contents of browser cache 126 after block 668 as having picDyn_Z012345678901.jpg, picStat.jpg, pageDyn_Z012345678915.html, and picDyn_Z012345679022.jpg. Flow proceeds to block 672.

At block 672, web browser 124 processes line 22 of pagedyn.html of FIG. 7, which commands web browser 124 to display picStat.jpg. Flow proceeds to block 674.

At block 674, web browser 124 checks to see if picstat.jpg hits in browser cache 126, according to block 412, and gets a hit. Flow proceeds to block 676.

At block 676, web browser 124 displays picstat.jpg on client computer 122. Flow ends at block 676.

As may be observed from the example of FIG. 6, the present invention operates to selectively cache static files of web page files 106 such as picstat.jpg, and to selectively defeat caching of dynamic files of web page files 106, such as picDyn.jpg and pageDyn.html.

Figure 10:
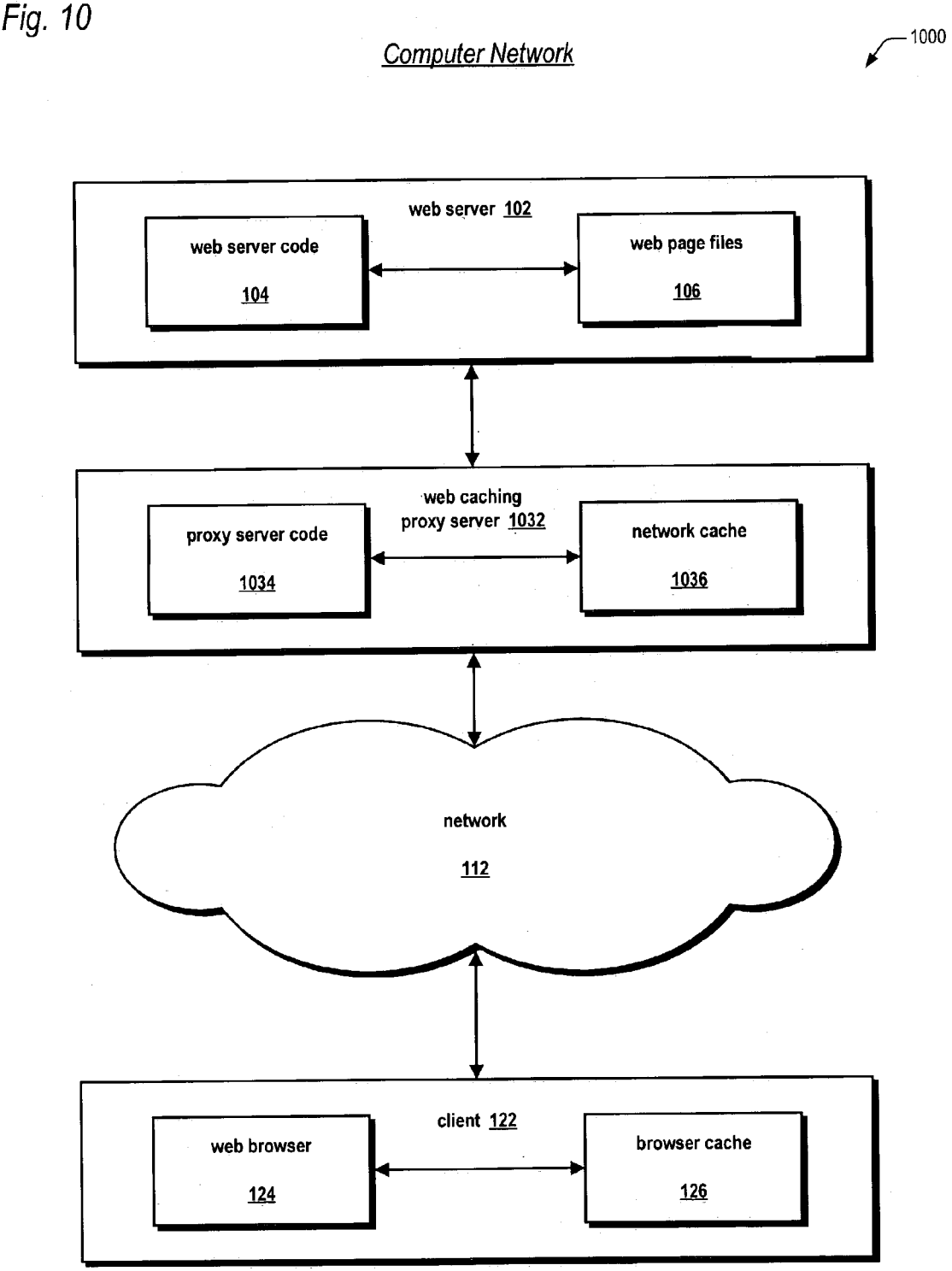
FIG. 10 is a block diagram of a computer network according to an alternate embodiment of the present invention.

Referring now to FIG. 10, a block diagram of a computer network 1000 according to an alternate embodiment of the present invention is shown. Computer network 1000 of FIG. 10 is similar to computer network 100 of FIG. 1, except that FIG. 10 also includes a web caching proxy server 1032 coupled between web server 102 and network 112. Web caching proxy server 1032 includes proxy server code 1034 and a network file cache 1036. Network cache 1036 caches web page files, such as web page files 106, somewhat similarly to browser cache 126. Proxy server code 1034 receives from network 112 http requests destined for web server 102. If the http request hits in network cache 1036, then proxy server code 1034 satisfies the http request by returning the requested cached file, and does not forward the http request to web server 102. However, if the http request misses in network cache 1036, then proxy server code 1034 requests the missing file from web server 102. Upon receiving the file from web server 102, proxy server code 1034 returns the received file to client computer 122 and caches the received file in network cache 1036 for subsequent requests for the file.

As may be observed from the foregoing description, network cache 1036 of web caching proxy server 1032 causes similar problems with respect to dynamic web page files 106 of web server 102 as are caused by the presence of browser cache 126 in client computer 122. Advantageously, the present invention as described above with respect to FIGS. 1 through 9 also operates to defeat caching of dynamic web page files 106 in network cache 1036, thereby avoiding the use of stale dynamic content, while also improving the performance of web applications due to increased caching of static web page files 106. That is, the unique mangled filenames of http requests that have a high probability of missing in browser cache 126 and are subsequently received by web caching proxy server 1032, also have a high probability of missing in network cache 1036, in which case the http request is forwarded to web server 102 so that web server 102 can return the latest dynamic data in the requested file.

Although the present invention and its objects, features and advantages have been described in detail, other embodiments are encompassed by the invention. For example, although a particular method of mangling filenames has been described, other embodiments are contemplated, and the present invention is not limited to a particular method of mangling a natural filename. The requirements of the mangling method are simply that it generate a pseudo-unique mangled filename that has a high probability of missing in a browser or network cache, thereby effectively defeating file caching, and that the natural filename is able to be regenerated from the mangled filename. For example, another embodiment is contemplated in which the unique 14-character string is affixed to the beginning rather than the end of the root portion of the filename. Another embodiment is contemplated in which a random number generator with a sufficiently non-biased statistical distribution is called to obtain the 12-digit string rather than using a timestamp. Other non-numerical characters than the "_Z" characters of the 14-digit string may be used. Furthermore, shorter or longer unique strings may be used. However, it is noted that the shorter the unique string appended, the less effective the mangling may be in defeating file caching for dynamic files. An advantage of using a relatively large timestamp string is that it is effectively guaranteed to yield a unique filename for caching purposes for the rollover period of the timestamp generator. Hence, for example a timestamp generator that has a period of 20 years should yield a unique filename for all requests during that period, as long as the granularity of the timestamp is smaller than the shortest amount of time in between queries to the timestamp generator with respect to the same natural filename.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A method for improving web application performance through selective file caching in a browser cache, the method comprising:
   altering a first filename to create a second filename, the first filename specifying a file on a web server, wherein the second filename has a high probability of missing in the browser cache; and
   issuing a request to the web server for the second filename.

2. The method of claim 1, further comprising:
   setting a cache policy of the browser cache to always cache files whenever possible, prior to said altering a first filename to create a second filename.

3. The method of claim 1, wherein said altering and said issuing are performed by a client computer coupled to the web server by a network.

4. The method of claim 3, wherein the client computer executes the web browser.

5. The method of claim 1, wherein said altering a first filename to create a second filename comprises appending a string to the first filename.

6. The method of claim 5, wherein the string has a predetermined portion and a unique portion.

7. The method of claim 6, wherein the unique portion comprises a timestamp.

8. The method of claim 7, further comprising:
   obtaining the timestamp from a computer performing said altering.

9. The method of claim 1, wherein the request to the web server for the second filename comprises an http request.

10. The method of claim 9, further comprising:
    creating the http request using the second filename.

11. The method of claim 1, wherein said issuing a request to the web server for the second filename comprises issuing the request on the world-wide-web.

12. The method of claim 1, wherein the file on the web server specified by the first filename is a file with dynamic content.

13. The method of claim 1, wherein said issuing a request to the web server for the second filename comprises a web browser issuing the request.

14. The method of claim 1, further comprising:
    issuing a second request to the web server for a third filename, the third filename specifying a file on the web server having static content, wherein the third filename is not altered, thereby having a high probability of hitting in the browser cache.

15. The method of claim 1, wherein said issuing a request to the web server for the second filename is performed in response to user input.

16. The method of claim 1, wherein said issuing a request to the web server for the second filename is performed in response to a web browser executing code in a file received from the web server.

17. The method of claim 1, wherein said altering a first filename to create a second filename comprises a web browser executing code in a file received from the web server.

18. The method of claim 17, wherein the code comprises JavaScript code.

19. The method of claim 17, wherein the code generates HTML code for the web browser to execute.

20. The method of claim 19, wherein the generated HTML code comprises a link to the second filename for displaying on a display screen.

21. The method of claim 19, wherein the generated HTML code comprises a reference to the second filename.

22. The method of claim 1, further comprising:
    at the web server, receiving the request for the second filename; and
    regenerating the first filename from the second filename.

23. The method of claim 22, further comprising:
    determining the second filename has been altered, prior to said regenerating the first filename from the second filename.

24. The method of claim 23, wherein said determining the second filename has been altered comprises determining the second filename has been altered according to a predetermined method.

25. The method of claim 22, wherein said regenerating the first filename from the second filename comprises removing a string from the second filename.

26. The method of claim 25, wherein the string has a predetermined portion and a unique portion.

27. The method of claim 26, wherein the unique portion comprises a timestamp.

28. The method of claim 22, further comprising:
    returning the file specified by the first filename to a client computer coupled to the web server by a network, after said regenerating the first filename, wherein the client computer performs said issuing a request to the web server for the second filename.

29. The method of claim 1, wherein the second filename is altered to have a high probability of missing in a network cache of a web caching server coupled between the web server and a client computer executing the web browser.

30. A method for achieving selective file caching in a browser cache of a client computer, the method comprising:
    at a web server, receiving http requests from the client computer, each of the http requests including a filename; and
    for each of the http requests:
        determining whether the filename is an altered form of an original filename specifying a file on the web server, the original filename having been altered to avoid the second filename hitting in the browser cache; and regenerating the original filename from the filename included in the http request, if the filename included in the http request is an altered form of the original filename.

31. The method of claim 30, further comprising:
returning to the client computer the file specified by the original filename, after said regenerating the original filename.

32. The method of claim 30, further comprising:
returning to the client computer the file specified by the filename included in the http request, if the filename is not an altered form of the original filename.

33. The method of claim 30, further comprising:
at the client computer:
altering the original filename to generate an altered filename.

34. The method of claim 33, further comprising:
at the client computer:
creating HTML code that references the altered filename.

35. The method of claim 33, further comprising:
at the client computer:
issuing one of the http requests to the web server, wherein the one of the http requests includes the altered filename.

36. A method for effecting selective file caching in a web browser cache, the method comprising:
at a client computer:
setting a cache policy of the browser cache to cache all files whenever possible;
mangling a natural filename to create a mangled filename, wherein the natural filename refers to a file on a web server;
issuing to the web server an http request for the mangled filename;
at a web server:
receiving the http request;
regenerating the natural filename from the mangled filename; and
returning to the client computer the file referred to by the natural filename.

37. The method of claim 36, further comprising:
at the client computer: determining the mangled filename misses in the browser cache, before said issuing to the web server an http request for the mangled filename.

38. The method of claim 36, wherein said file on said web server includes changing content.

39. The method of claim 36, wherein said mangling is performed by code being executed by a web browser on the client computer.

40. The method of claim 36, wherein the mangled filename has a high probability of missing in the browser cache.

41. The method of claim 36, wherein the mangled filename has a high probability of missing in a network cache of a proxy server coupled between the client computer and the web server.

42. The method of claim 36, further comprising:
at the web server: returning a file specified by a filename in a second http request if the second http request does not include a filename in a mangled format.

43. The method of claim 36, further comprising:
at the client computer: receiving user input after said mangling;
wherein said issuing to the web server an http request for the mangled filename is performed in response to said receiving said user input.

44. The method of claim 43, wherein the user input comprises a user clicking on a link specifying the http request.

45. The method of claim 44, further comprising:
displaying the link on the user's display, prior to said receiving user input.

46. The method of claim 36, wherein said mangling comprises executing JavaScript code.

47. A computer network, comprising:
a web server, for storing a first file having static content and a first filename, and second file having dynamic content and a second filename; and
a client computer, coupled to the web server, having a browser cache, said client computer configured to satisfy a request for said first file from said browser cache, and to issue to said web server an http request for said second file using a mangled version of said second filename, mangled to miss in said browser cache;
wherein said web server is configured to regenerate said second filename from said mangled filename and to return said second file to said client computer, in response to said http request.

48. The computer network of claim 47, wherein said browser cache is configured to a highest caching level.

49. The computer network of claim 47, wherein said web server comprises:
an I/O controller, for controlling one or more I/O devices coupled thereto.

50. The computer network of claim 49, wherein said first and second files comprise web page files used for managing said I/O controller.

51. The computer network of claim 49, wherein said I/O controller comprises a redundant array of inexpensive disks (RAID) controller.

52. The computer network of claim 47, further comprising:
a network, for coupling said web server and said client computer.

53. The computer network of claim 52, wherein said network comprises the world-wide-web.

* * * * *

UNITED STATES PATENT AND TRADEMARK OFFICE
CERTIFICATE OF CORRECTION

PATENT NO. : 7,076,500 B2
APPLICATION NO. : 10/610142
DATED : July 11, 2006
INVENTOR(S) : David Austin Gallant and Rex Weldon Vedder It is certified that error appears in the above-identified patent and that said Letters Patent is hereby corrected as shown below:

Title Page, below "Primary Examiner", insert
--Attorney, Agent, or Firm:

E. Alan Davis
James W. Huffman--

After Item (76) insert Item --(73) Assignee:

Dot Hill Systems Corporation    Carlsbad, CA--

Signed and Sealed this

Twenty-first Day of August, 2007

JON W. DUDAS
*Director of the United States Patent and Trademark Office*